US009135231B1

(12) United States Patent  
Barra et al.

(10) Patent No.: US 9,135,231 B1  
(45) Date of Patent: Sep. 15, 2015

(54) TRAINING PUNCTUATION MODELS

(71) Applicants: Hugo B. Barra, San Francisco, CA (US); Robert W. Hamilton, San Francisco, CA (US)

(72) Inventors: Hugo B. Barra, San Francisco, CA (US); Robert W. Hamilton, San Francisco, CA (US)

(73) Assignee: Google Inc., Mountain View, CA (US)

( * ) Notice: Subject to any disclaimer, the term of this patent is extended or adjusted under 35 U.S.C. 154(b) by 159 days.

(21) Appl. No.: 13/755,702

(22) Filed: Jan. 31, 2013

Related U.S. Application Data

(60) Provisional application No. 61/709,569, filed on Oct. 4, 2012.

(51) Int. Cl.  
*G06F 17/27* (2006.01)  
*G10L 15/26* (2006.01)  
*G10L 15/00* (2013.01)  
*G10L 21/00* (2013.01)  
*G06F 17/24* (2006.01)  
*G10L 15/22* (2006.01)

(52) U.S. Cl.  
CPC ................ *G06F 17/24* (2013.01); *G10L 15/00* (2013.01); *G10L 15/22* (2013.01); *G10L 15/26* (2013.01)

(58) Field of Classification Search  
None  
See application file for complete search history.

(56) References Cited

U.S. PATENT DOCUMENTS

| | | | |
|---|---|---|---|
| 6,067,514 A | 5/2000 | Chen | |
| 7,043,431 B2 * | 5/2006 | Riis et al. | 704/259 |
| 7,236,931 B2 | 6/2007 | He et al. | |
| 7,580,838 B2 | 8/2009 | Divay et al. | |
| 7,979,281 B2 * | 7/2011 | Kahn et al. | 704/270 |
| 8,041,566 B2 | 10/2011 | Peters et al. | |
| 8,346,555 B2 * | 1/2013 | Metz | 704/257 |
| 8,498,872 B2 * | 7/2013 | White et al. | 704/270.1 |
| 8,914,286 B1 * | 12/2014 | Secker-Walker et al. | 704/244 |
| 8,918,317 B2 * | 12/2014 | Fritsch et al. | 704/235 |
| 2003/0009331 A1 * | 1/2003 | Schalkwyk et al. | 704/237 |
| 2005/0131559 A1 * | 6/2005 | Kahn et al. | 700/94 |
| 2006/0190249 A1 * | 8/2006 | Kahn et al. | 704/235 |
| 2007/0129938 A1 | 6/2007 | Wang et al. | |
| 2007/0192309 A1 | 8/2007 | Fischer et al. | |
| 2008/0255837 A1 * | 10/2008 | Kahn et al. | 704/235 |
| 2009/0124272 A1 * | 5/2009 | White et al. | 455/466 |
| 2010/0057463 A1 * | 3/2010 | Weng et al. | 704/257 |
| 2010/0070268 A1 * | 3/2010 | Sung | 704/203 |
| 2010/0145700 A1 * | 6/2010 | Kennewick et al. | 704/257 |

(Continued)

FOREIGN PATENT DOCUMENTS

WO 2005/050621 6/2005

OTHER PUBLICATIONS

Xu et al., "Parsing Hierarchical Prosodic Structure for Mandarin Speech Synthesis," IEEE International Conference on Acoustics, Speech and Signal Processing, May 14-19, 2006, 745-748.

*Primary Examiner* — Satwant Singh  
(74) *Attorney, Agent, or Firm* — Fish & Richardson P.C.

(57) ABSTRACT

Methods, systems, and apparatus, including computer programs encoded on a computer storage medium, for customizing the punctuation style of a transcription. A method includes receiving an utterance from a user, obtaining an unpunctuated transcription of the utterance, identifying an instance within the unpunctuated transcription where a punctuation mark may be placed, identifying, using data associated with the user, one or more past instances that are similar to the identified instance, punctuating the unpunctuated transcription based at least on the one or more past instances, and presenting the punctuated transcription to the user.

17 Claims, 4 Drawing Sheets

(56) References Cited

U.S. PATENT DOCUMENTS

| | | |
|---|---|---|
| 2010/0204986 A1* | 8/2010 | Kennewick et al. .......... 704/226 |
| 2010/0204994 A1* | 8/2010 | Kennewick et al. .......... 704/257 |
| 2010/0286985 A1* | 11/2010 | Kennewick et al. .......... 704/257 |
| 2012/0166193 A1* | 6/2012 | Kobal et al. ................... 704/235 |
| 2013/0297293 A1* | 11/2013 | Di Cristo et al. ................. 704/9 |
| 2014/0108013 A1* | 4/2014 | Di Cristo et al. ............. 704/254 |
| 2014/0136212 A1* | 5/2014 | Kwon et al. ................... 704/275 |
| 2014/0149119 A1* | 5/2014 | Sak et al. ...................... 704/260 |
| 2014/0249821 A1* | 9/2014 | Kennewick et al. .......... 704/257 |
| 2015/0095025 A1* | 4/2015 | Fritsch et al. ................. 704/231 |

* cited by examiner

TRAINING PUNCTUATION MODELS

CROSS REFERENCE TO RELATED APPLICATION

This application claims the benefit of U.S. Provisional Application Serial No. 61/709,569, filed on Oct. 4, 2012, which is incorporated by reference.

TECHNICAL FIELD

This specification relates to speech recognition and, according to one exemplary implementation, to the automated punctuation of a transcription of an utterance.

BACKGROUND

Users of computing devices often find it more convenient to use dictation to create messages (e.g., e-mail messages, or SMS text messages), rather than to type or key messages into the computing device. For example, a user of a smartphone with speech recognition functionality may utter the content of an e-mail message to the smartphone. Using a speech recognition process, the smartphone can facilitate the process of transcribing the utterance to text. The smartphone can subsequently present the transcription to the user in the body of an e-mail message that is staged to be sent.

SUMMARY

This specification describes systems and processes for punctuating a transcription of a user's utterance in accordance with the style of punctuation exhibited in the user's past type-written electronic communications and documents. In brief, this can be accomplished by first identifying a passage of text from the transcription for which at least two acceptable punctuation approaches exist. The user's stored electronic communications can then be parsed to find instances where the user used a particular style of punctuation in a similar context. Based on the particular punctuation style most commonly used in the user's past communications, a custom punctuation rule for the user can be determined. The custom punctuation rule can then be applied to the passage of the transcription to result in a type-written message that is punctuated in accordance with the user's personal style preferences for punctuation.

As used by this specification, an "utterance" includes a vocal noises issued by the user of a computing device employing speech recognition. An utterance can include phonetic representations of textual words, vocal commands, pauses, non-word noises, and all other types of vocal sounds produced by the user.

"Speech recognition" or "transcribing" relates to the process of translating an utterance to text using an automated "speech recognition" (ASR) system. In speech recognition, acoustic and language models can be used by speech recognition engines to statistically analyze an encoded utterance in order to create one or more likely text strings that reflect the sounds of the speaker. Some ASR systems may use phonetic dictionaries (i.e., lists of words and their phonetic spellings) when performing transcription. Phonetic dictionaries have generally been compiled by including pronunciation guides from standard language dictionaries, and by manually labeling acoustic examples of various words spoken by various speakers. Many speech recognition engines have a group of parameters that may be adjusted to change the way that an utterance is analyzed.

"Transcription" relates to the textual output provided by a speech recognition process. In this usage, transcription is a noun. In some cases a transcription can include text that has had capitalization and punctuation rules applied to the text, while in other cases the transcription can be text without capitalization and punctuation. The transcription of a message is typically presented to the user for review prior to the sending of the message. In some cases, the user may choose to edit the transcription prior to sending.

A "client computing device" or "computing device" includes all types of personal electronic devices that operate using a computer processor (e.g. cell phone, smart phone, PDA, mobile computing device, tablet computer, music player, wearable computer, e-book reader, desktop computer, laptop computer, etc.).

"Written electronic communications" or "past communications" may refer to any synchronous or asynchronous conveyance or exchange of news, views, or information between two human or non-human entities, such as a message (e.g., an e-mail message, an instant message, a social network message or post), or a document (e.g., an electronic file).

Accordingly, one innovative aspect of the subject matter described in this specification may be embodied in methods that include the actions of determining the punctuation style to use when punctuating a transcription generated from an utterance made by a user. The punctuation style to be used for an instance in the transcription may be determined by parsing the user's stored data to find similar instances, and selecting a punctuation style based on the punctuation style used in the similar instances.

In general, an innovative aspect of the subject matter described in this specification may be embodied in methods that include the actions of receiving an utterance from a user, obtaining a transcription of the utterance, identifying an instance within the transcription where a punctuation mark may be placed, identifying, using data associated with the user, one or more past instances that are similar to the identified instance, punctuating the transcription based at least on the one or more past instances, and presenting the punctuated transcription to the user.

In general, another innovative aspect of the subject matter described in this specification may be embodied in methods that include the actions of obtaining a transcription of an utterance of a user, determining that one or more punctuation rules dictate that a punctuation mark may be placed at a particular location within the transcription, identifying text that: (i) was written by the user; (ii) is similar to the utterance; and (iii) includes a location that corresponds to the location within the transcription, determining whether the user placed the punctuation mark at the corresponding location within the text, and determining whether to place the punctuation mark at the particular location within the transcription, according to the one or more punctuation rules based on determining whether the user placed the punctuation mark.

In general, another innovative aspect of the subject matter described in this specification may be embodied in methods that include the actions of determining whether to place a punctuation mark within a transcription based on determining whether a user previously placed the punctuation mark in written text that is similar to the transcription.

Other embodiments of this aspect include corresponding systems, apparatus, and computer programs, configured to perform the actions of the methods, encoded on computer storage devices.

These and other embodiments may each optionally include one or more of the following features. For instance, developing custom punctuation rules based on one or more past usages of two or more methods of punctuation for the identified instance; the data associated with the user may comprise one or more electronic mail messages, SMS text messages, social media messages, or word processing documents; creating an electronic communication using the punctuated transcription, wherein the electronic communication is a type of electronic communication selected from the group consisting of an electronic mail message, a SMS text message, a social media message or post, or a word processing document; the past instances that are similar to the identified instance may be restricted to being exclusively a same type of electronic communication as the type of electronic communication created; and punctuating the transcription may be based at least on a standard punctuation rule set.

Particular embodiments of the subject matter described in this specification may be implemented to realize one or more of the following advantages. The convenience of initiating a communication using speech recognition may be improved, thereby enhancing the user experience and increasing user satisfaction. For example, a user may be able to use speech recognition to generate communications that are punctuated according to the user's preferences. As a result, the user will be enabled to efficiently generate and send satisfactory typewritten communications. In addition, the user's satisfaction can be improved by reducing or eliminating the need to make edits to the punctuation of a transcription prior to sending a communication. Such improvements can increase the quality and efficiency of a speech recognition and transcript punctuation process.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers represent corresponding parts throughout.

DETAILED DESCRIPTION

A speech recognizer may use a punctuation model to apply standard punctuation rules that predict the proper placement and type of punctuation marks (e.g., commas, semicolons, colons, and periods) to be inserted into a transcription. As a result, a user can be presented with a transcription that is punctuated in a grammatically correct manner. But, in some instances, usages of punctuation are based on the user's stylistic choice. Further, some punctuation rules may depend somewhat on the geographic location of the user, or the industry, or the type of writing that the user is involved in. That is, some punctuation rules have alternatives, resulting in at least two ways of grammatically correctly punctuating some sentences.

A commonly known example of a type of punctuation that has alternatives is the serial comma (also known as the Oxford comma). The Oxford comma is an optional comma that can be used after the second-to-last item in a list of three or more items. Some writers use the Oxford comma, while others do not. Both styles, i.e. using the Oxford comma or forgoing usage of the Oxford comma, are usually considered to be grammatically acceptable. Use of the Oxford comma is merely a stylistic choice of the writer.

When the speech recognizer of a computing device punctuates an utterance, the speech recognizer will apply particular punctuation rules. The application of the particular rules will result in an appropriately punctuated message that, while grammatically correct, may not be consistent with the stylistic preferences of the user. For example, the user may want to include the Oxford comma, but the punctuation model may not do so. In that case, the end result will either be that the message will be sent without being punctuated the way the user would like, or the user will spend additional time to modify the punctuation of the message before sending it.

Figure 1:
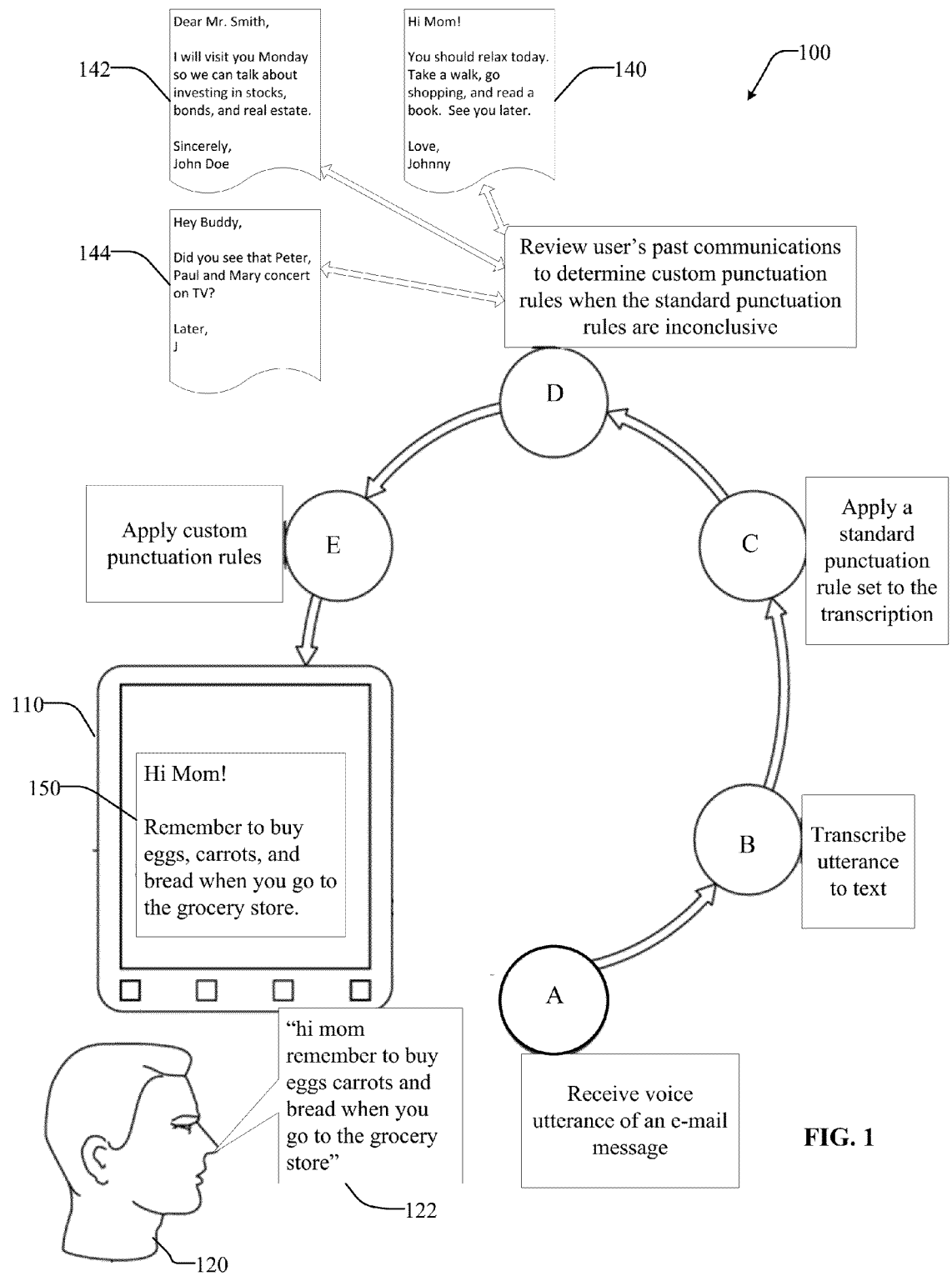
FIG. 1 is a diagram of an example process that applies a user's punctuation preferences to a transcription.

FIG. 1 is a diagram of an example process 100 that applies a user's punctuation preferences to a transcription. The diagram depicts a human user 120. The user 120 provides an utterance to a computing device which generates the transcription. In this example, the computing device is represented by a mobile computing device ("mobile device") 110. Hence, the example process 100 is illustrated by the user 120 interacting with mobile device 110. FIG. 1 also depicts states (A) through (E) showing the operations performed by the mobile device 110 to execute example process 100.

While the mobile device 110 is provided as the example computing device performing process 100, the computing device performing process 100 can actually be any of a variety of different types of computing devices (e.g. cell phone, smart phone, PDA, tablet computer, music player, wearable computer, e-book reader, desktop computer, laptop computer, or other processing device). Further in some embodiments of process 100, certain operations or parts of certain operations may be performed at a server system, including a cloud-based server system, rather than completely on a client computing device such as the mobile device 110. Such a division of tasks may provide better process optimization, computational efficiency, and response time. However, in other embodiments, all or substantially all of the operations of process 100 may be performed on the client computing device as illustrated in example process 100.

In this example, the user 120 is depicted as using example process 100 to generate an e-mail message. In other implementations, the concepts of example process 100 can be used to create other types of type-written communications (e.g., SMS text messages, social media posts and comments, word processing documents, and any other kind of computer-generated type-written communication).

At operation (A), the mobile device 110 receives an utterance 122 spoken by user 120. The mobile device 110 can include a microphone for receiving audio input. The mobile device 110 may be running, for example, an e-mail text editor with a speech recognition input, or any other appropriate program. The mobile device 110 can include electronic circuitry for converting the utterance to an audio signal (or "audio file," "waveform," or "sample") that corresponds to the utterance 122.

It should be noted that in example process 100, the utterance 122 spoken by user 120 is devoid of any explicitly specified punctuation. That is, in some cases, a user of speech recognition technology can insert punctuation in a transcription by calling for particular punctuation marks by uttering, for example, "period," "comma," or "question mark." In response, the ASR system will insert into the transcription the type of punctuation uttered by the user. While this approach can be effective, many users consider it to be tedious, time consuming, and inhibitive of the free flow of thoughts that the user would like to capture in the transcription. Hence, the example process 100 does not require the user 120 to utter a command to insert punctuation marks that they desire in the transcription. However, the example process 100 can also accommodate such an input of punctuation—and it can correct or supplement the provided punctuation in accordance with the operations (A) through (E) described here.

At operation (B), the mobile device 110 can transcribe the audio data of the utterance 122 to a transcription. The mobile device 110 may be running an ASR system. In some cases, the ASR system can use a language model that includes a large vocabulary statistical language model capable of transcribing complex user utterances. To determine the ASR transcription, the ASR system may generate one or more candidate transcriptions that match the utterance 122 encoded in the audio data received from operation (A). Speech recognition confidence values for the candidate transcriptions can be generated. The transcription with the highest confidence value may be selected by the ASR engine as the designated transcription. Other techniques may also be used to create a transcription, and to select which candidate transcription to use as the designated transcription.

As mentioned previously, some operations of example process 100, including operation (B) for example, can also be performed by a remote computer server system in communication with the mobile device 110. Such a server can also include one or more servers operating in a system, and a cloud-based server system. For example, the mobile device 110 may generate a request containing a user identifier and the audio data file that encodes the utterance 122, and may transmit the request via a network to the speech recognition server. A server may have greater processing capabilities and a more extensive vocabulary than the mobile device 110. In some cases, the server can perform an ASR process on the audio data in lieu of the mobile device 110 performing ASR. In other cases, both the mobile device 110 and a server may perform ASR on the audio data simultaneously or substantially at the same time. In some cases the mobile device 110 may send just some or all of the audio data to a server only if the mobile device 110 is unable to achieve a transcription that exceeds a threshold value for a level of confidence. In such a case, the mobile device 110 may call on a server having a more sophisticated ASR system only on an as-needed basis. The designated transcription can be selected by combining the results of the mobile device 110 and the server, or by giving priority to either the mobile device 110 or the server. In other examples, the designated transcription may be selected on the basis of whichever ASR system completes the ASR process first (as long as a threshold confidence level is achieved).

Referring again to the example process 100 of FIG. 1, as described above, the mobile device 110 received the utterance 122 from the user 120 at operation (A). Now in operation (B), the mobile device 110 transcribes the utterance 122 to text. That is, the result of operation (B) as applied to utterance 122 will provide the following text passage; "hi mom remember to buy eggs carrots and bread when you go to the grocery store". As seen, operation (B) has resulted in a transcription, but the transcription has no punctuation at this stage, At operation (C), the mobile device 110 can use an automated punctuation model to apply a standard punctuation rule set to the designated transcription produced from (B). In general, methods for automatically punctuating an utterance using statistical modeling are known in the art. Such systems may statistically analyze pauses and non-word noises (e.g., "um" or "ah") in the audio data, combined with the context provided by the boundary words (the word or words preceding and succeeding the pause or non-word noise), to predict where to insert particular punctuation marks.

The context provided by words bounding a pause or non-word noise can be illustrated as follows. For example, in the English language, a punctuation mark never appears after the words: "the," "a," "very," and "our." However, punctuation marks often occur prior to the words: "the, "a," and "we." Hence, the words before and after a pause can provide a clue to whether a punctuation mark belongs at that location in the text.

Using such contextual rules of probability in combination with pauses and non-word noises from the speaker, can result in a statistical prediction of the proper punctuation of a transcription. A score may be calculated that represents the probability that particular punctuation mark belongs in a certain location of the text. When the score is above a threshold level the punctuation model can insert the punctuation mark in the text.

While one technique for automatic punctuation has been described above, other approaches for automatic punctuation are also within the scope of the systems and techniques described here. For example, other automatic punctuation systems may be more focused on identifying structural characteristics of the relationships between each word in a passage of text in order to predict the proper punctuation of the passage.

In some embodiments, the application of the standard punctuation rules can be performed by the client device, such as the mobile device 110. However, in other embodiments the application of the standard punctuation rules can be performed by a server system that is in communication with the client device. Such as server system may have the necessary processing power to run a more sophisticated punctuation model than the client device.

As mentioned previously, in some cases multiple ways of punctuating a passage of text are grammatically acceptable. For example, usage of the Oxford comma is optional. The example utterance 122 can be used to further illustrate the optional usage of the Oxford comma. Usage of the Oxford comma would result in the following modification to the punctuation of utterance 122: "Remember to buy eggs, carrots, and bread when you go to the grocery store." Equally acceptable is a punctuation of utterance 122 that does not use the Oxford comma, which is written: "Remember to buy eggs, carrots and bread when you go to the grocery store." The difference between the two versions is the presence or absence of the comma immediately after the word "carrots." Another example of optional punctuation is the type of punctuation used after a salutation. For example, "Dear John," or "Dear John:" are both acceptable. Still another example is whether to use one space or two spaces between sentences. A further example is whether to use a hyphen for compound words. That is, for example, "entry level" and "entry-level" are both grammatically correct.

In the scenarios where multiple ways of punctuating a passage of text are grammatically acceptable according to standard rules of grammar, a person, such as user 120, may have a preferred style of punctuating, and the user may typically use that style. For example, some people consistently use the Oxford comma, while other people consistently do not use it.

Automated punctuation models, such as those referenced above, can be used to identify instances in which multiple ways of punctuating a passage of text are acceptable. For example, by using pauses, non-word noises, and boundary word analysis, an automated punctuation model can be used to statistically predict the scenario in which the Oxford comma can be used (or not used). The Oxford comma scenario exists in regard to a list of three or more items. A person uttering a sentence including a list of items will typically include short pauses between the items. Further, an "and" will precede the final object in the list. These factors can be identified and analyzed by a punctuation model in order to identify that an Oxford comma scenario exists. In those scenarios, the confidence level of the punctuation model for inserting a punctuation mark at that location of the text may be indicative of an instance for which one or more acceptable rules exist. More specifically, the confidence level may be below an upper threshold level and above a lower threshold level. This middle range of confidence levels can be used to indicate an instance where two or more punctuation approaches are acceptable.

The result of operation (C) is a transcription that has the standard rules of punctuation (and consequently, capitalization) applied to it. In addition, the result of operation (C) can include a determination of the instances for which multiple ways of punctuation are acceptable. For example, the result of operation (C) from having processed utterance 122 could be represented as follows: "Hi Mom[ ] Remember to buy eggs, carrots[ ] and bread when you go to the grocery store." In the preceding sentence, the square brackets "[ ]" are used to illustrate locations of instances where multiple ways of punctuation are acceptable as determined by the punctuation model. The optional punctuation mark after the salutation, "Hi Mom" can be a comma, colon, semi-colon, exclamation point—whatever the user 120 chooses to use. The optional punctuation mark after "carrots" is the Oxford comma, which can be used or completely left out. In reference to those two example locations, the punctuation style preferences of the user 120 can now be determined and applied.

At operation (D), the user's past communications can be reviewed to determine custom punctuation rules for the situations where multiple ways of punctuation are acceptable, i.e., where the standard punctuation rules are inconclusive. In a nutshell, (D) can be a review of the user's stored documents to see how they tend to punctuate in those cases where multiple punctuations are acceptable.

As stated above, a person may tend to prefer to use one particular punctuation style for those situations where multiple punctuation approaches are acceptable. The person, for example, may tend to use the Oxford comma because they feel it avoids ambiguity. Others may tend to forgo the Oxford comma because they feel it hinders a smooth reading of the passage. Such determinations may influence the user's preferred style of punctuation.

Operation (D) of example process 100 illustrates the review of three past communications 140, 142, and 144 that are past e-mail messages that were created by user 120. Of course, in practice, the review is not limited to such a minimal number of past communications or documents. In fact, the entirety of the user's saved communications and documents can be reviewed for this purpose. In some embodiments, however, a threshold number of communications and documents can be reviewed. Or, the number of communications and documents reviewed can be a set minimum number in combination with a calculation of statistical probability (or confidence) of the determination of the user's preference for a punctuation style in comparison to a threshold level. That is, if after the review of the set minimum number of documents, the statistical probability of the user's punctuation preference is not at or above a confidence threshold level, then the system can continue reviewing communications and documents until the confidence threshold level is reached, or there are no more communications and documents to be reviewed.

In this example, all three past communications are e-mail messages. In some embodiments, as in this example, the documents reviewed in operation (D) can be restricted to the same type of document that is in the process of being punctuated. That is, for example, if the user is creating an e-mail message by transcription, the review of the user's documents in (D) can be limited to only e-mail messages. However, in other embodiments, any kind of saved writing created by the user can be reviewed for any type of transcription that is being punctuated.

The example process 100 illustrates the review of the user's past communications as being performed by mobile device 110. However, in some embodiments the review may be performed by a remote server system, including a cloud-based server system. In some embodiments, the review of the user's past communications may be performed by a combination of the client device, such as mobile device 110, and a remote server system.

As stated above, the result of operation (C) on utterance 122 was as follows: "Hi Mom[ ] Remember to buy eggs, carrots[ ] and bread when you go to the grocery store." The square brackets "[ ]" represent placements, or locations of instances where multiple ways of punctuation are acceptable—as identified by a mid-level statistical confidence value assigned by the punctuation model (in some embodiments). Therefore, at operation (D) the user's past communications (e-mail messages 140, 142, and 144) will be reviewed to determine how the user 120 tends to punctuate in regard to those two particular instances that are inconclusive.

The first instance of inconclusive punctuation to be addressed at operation (D) is located in utterance 122 after the salutation: "Hi Mom[ ]". The user's past e-mails 140, 142, and 144 are reviewed to determine how the user 120 tends to punctuate after a salutation. In some embodiments, this can be done in a generic sense. That is, operation (D) can determine how user 120 tends to punctuate after salutations in general, independent of to whom the salutation is directed. However, in other embodiments, such as example process 100, more importance can be placed on specifically how the user 120 tends to punctuate after a salutation to the particular name used in the salutation, e.g., "Mom." In some embodiments, an algorithm can be used that combines the generic and specific instances. More weighting can be applied to the specific instances. If no specific or general instances are found in the user's past communications/documents, the punctuation model can insert a punctuation mark (or no punctuation mark) based on a statistical prediction from a broader population of users.

In the past e-mail messages 140, 142, and 144, the user 120 twice used a comma after the salutation, and once used an exclamation mark. In a specific sense, the user 120 used an exclamation mark after a salutation to "Mom," which is the same name that utterance 122 is directed to. Therefore, in this example process 100, the exclamation mark used in past e-mail 140 after the salutation to "Mom" is given more significance, and is determined as a custom rule for user 120. Of course, this example is substantially simplified to make it readily explainable. In practice, an algorithm combining a number of variables with various weighting factors can be used. For example, the variables can include the number of documents reviewed, the age of those documents, specific instances where the punctuation was used, generic instances where the punctuation was used, threshold levels, reviews of the specific type of document being transcribed, reviews of other types of documents that are not the type being transcribed, and so on. These, and others, can all be inputs to a statistical model for determining a confidence level of the punctuation preferences of the user in relation to the inconclusive punctuation instances identified by the application of the standard punctuation rule set. In the example process 100, the result of (D) as applied to the salutation is a custom rule that after a salutation to "Mom" the process will insert an exclamation mark, i.e., "Hi Mom!"

The second instance of inconclusive punctuation to be addressed by operation (D) is located in the utterance 122 after the word "carrots[ ]". Here the reason for the inconclusiveness is that an Oxford comma can be placed there—or not. In other words, the application of the standard punctuation rules by the punctuation model would have resulted in a mid-level confidence value for the insertion of a comma at that location in the text. So, in response, at (D) the mobile device 110 will review the user's past communications 140, 142, and 144 to determine a customized punctuation rule for user 120 that pertains to the user's preferences regarding usage of the Oxford comma.

First, in e-mail message 140, user 120 used an Oxford comma. Specifically, it is the comma after the word "shopping." Next, in e-mail message 142, user 120 also used an Oxford comma. It is the comma after the word "bonds". Lastly, in e-mail message 144, user 120 did not use an Oxford comma. That is, no comma was used after the word "Paul". So, in two out of three cases, user 120 used the Oxford comma.

In accordance with the example algorithm of example process 100, the determination that user 120 used the Oxford comma ⅔ (67%) of the time in the reviewed past communications 140, 142, and 144 would be compared to a threshold level. If determined value is at or above the threshold level, it can be deemed significant enough to determine a customized punctuation rule concerning the Oxford comma. That is, assuming 67% is above the threshold level, in this example a customized rule that user 120 prefers to use the Oxford comma is determined at operation (D). However, if the determined value is below the threshold level, the punctuation model can default to inserting a punctuation mark (or no punctuation mark) based on a statistical prediction from a broader population of users. Of course, much more sophisticated algorithms (as referenced above) for determining the user's customized punctuation rules can be utilized.

In some embodiments, the custom punctuation rules that are determined at operation (D) can be saved so that the review of the past communications does not need to be repeated for each time a transcription includes an inconclusive punctuation situation. For example, a single transcription may include multiple instances where an Oxford comma may potentially be used. In that case, the review of the past communications may not need to be repeated again after the first time. Or, alternatively, a particular customized rule may be retained for a period of time, such as a day, week, month, and so on, such that the review of past documents need not be repeated in regard to the user's particular customized rule for that period of time—after which time the rule could expire and the user's documents will be reviewed again to determine the customized punctuation rule. In other cases, a particular customized rule may be retained for an established number of uses. That is, a customized rule may be used twice, ten times, twenty times, and so on, such that the review of past documents need not be repeated in regard to the particular customized rule for that number of usages—after which the rule could expire and the user's documents will be reviewed again to determine the customized punctuation rule.

At operation (E) of example process, the custom punctuation rules determined at (D) are applied to the utterance 122. In the example provided, two customized punctuation rules were developed at (D): (1) the usage of an exclamation point after a salutation to "Mom" and (2) the usage of the Oxford comma. The example utterance 122, resulting from operation (C) to which the rules are to be applied is: "Hi Mom[ ] Remember to buy eggs, carrots[ ] and bread when you go to the grocery store." The square brackets "[ ]" represent locations of instances where multiple ways of punctuation are acceptable. After applying the customized punctuation rules from (D), the utterance 122 becomes: "Hi Mom! Remember to buy eggs, carrots, and bread when you go to the grocery store." That transcription 150 is then displayed on the interface of the mobile device 110 as shown. The transcription 150 is punctuated in accordance with the user's preferences. Of course, the user 120 can then proof-read the transcription prior to sending it. The user 120 can edit the message (if necessary) and then send the message when the user 120 is satisfied with it.

Figure 2:
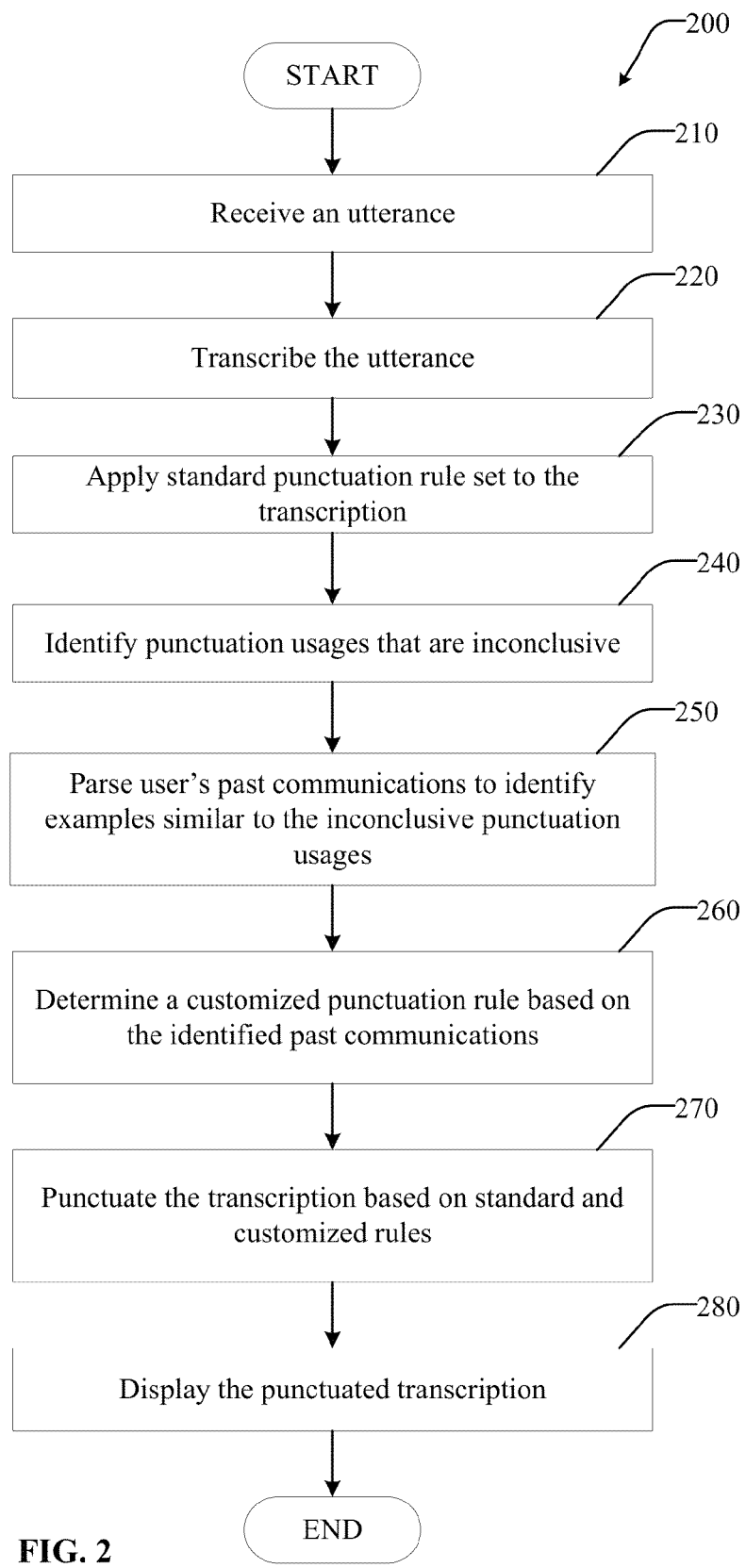
FIG. 2 is a flowchart of an example process for transcribing an utterance and punctuating the transcription according to the punctuation preferences of the user.

FIG. 2 is a flowchart of an example process 200 for transcribing an utterance and punctuating the transcription according to the punctuation preferences of the user. In general, the example process 200 can be performed by a client computing device, or by a combination of a client computing device and a server system in communication with the client computing device via a network.

The example process 200 starts by receiving an utterance 210. The utterance can be, for example, the content of a communication that the user has spoken to the client computing device. The communication can be, for example, an e-mail message, a SMS text message, or a social network post or comment. In other examples, the utterance can be used to create other types of documents such as a word processing document, calendar entry, personal note, and so on. The client device receiving the utterance can create an audio file (of various formats) containing the encoded utterance information.

At 220, the client computing device can analyze the audio information to transcribe the utterance. At this stage, the transcription can contain text, but is without punctuation. An ASR system of the type known in the art can be used to perform this operation.

At 230, a standard punctuation rule set can be applied to the transcription. This operation can be performed, for example, by using a statistical punctuation model. That is, for example, some punctuation models identify pauses or non-word noises in the audio information, and then statistically analyze the word or words prior to and following the pause or non-word noise. In this general fashion, the punctuation model can determine candidate punctuation marks for incorporation into the text, and confidence levels associated with the correctness of inserting those candidate punctuation marks.

At 240, the client device can identify punctuation usages that are inconclusive. That is, the punctuation model can identify instances in the transcription where there are two or more grammatically correct ways to punctuate the passage of text in the transcription. This may be represented by the calculation by the punctuation model of a mid-level confidence value for insertion of a particular punctuation mark. These instances can include, for example, the Oxford comma, punctuation after salutations, whether to have one or two spaces between sentences, whether to include periods for acronyms, whether to hyphenate potential compound words, what punctuation to use to separate two potentially independent statements that are included in a single sentence, and so on.

At 250, the user's past communications can be parsed to identify examples that are similar to the instances of inconclusive punctuation usages from step 240. For example, if a potential for using an Oxford comma was identified in the transcription, the user's past communications or documents can be parsed to find similar instances where the user either used or did not use the Oxford comma. Optionally, the parsing can be narrowed, for example, to the same type of documents (e.g., e-mail messages), or to the same recipient. Priority can be given to newer documents. A statistical model can be used to determine a confidence level of the user's punctuation preferences. Punctuation usages within the user's past communications that are deemed similar in context to the instance of inconclusiveness of the transcription can be weighted with more significance than other general usages within the users past communications. In response to the confidence level, the process of parsing can be managed or controlled. For example, the parsing can be stopped when a threshold level of confidence is reached.

At 260, customized punctuation rules can be developed based on the identified past communications that displayed the user's punctuation preferences. For example, a customized rule may be developed that the user prefers to not use Oxford commas. Or, for example, a customized rule can be developed that the user prefers to only have one space between sentences. In some embodiments, these customized punctuation rules can be saved in order to reduce the repeating of operation 250.

At 270, the standard punctuation rules and the custom punctuation rules can be applied to the transcription. In other words, the transcription can be fully populated with punctuation marks in accordance with both the standard rules and the customized rules, such that the transcription is ready to be presented to the user.

At 280, the fully punctuated transcription can be presented to the user. At this point, the transcription can be punctuated in accordance with the user's punctuation preferences, and in accordance with standard rules of punctuation. The user can review the transcription, and make edits if necessary, prior to sending the message or saving the document.

Figure 3:
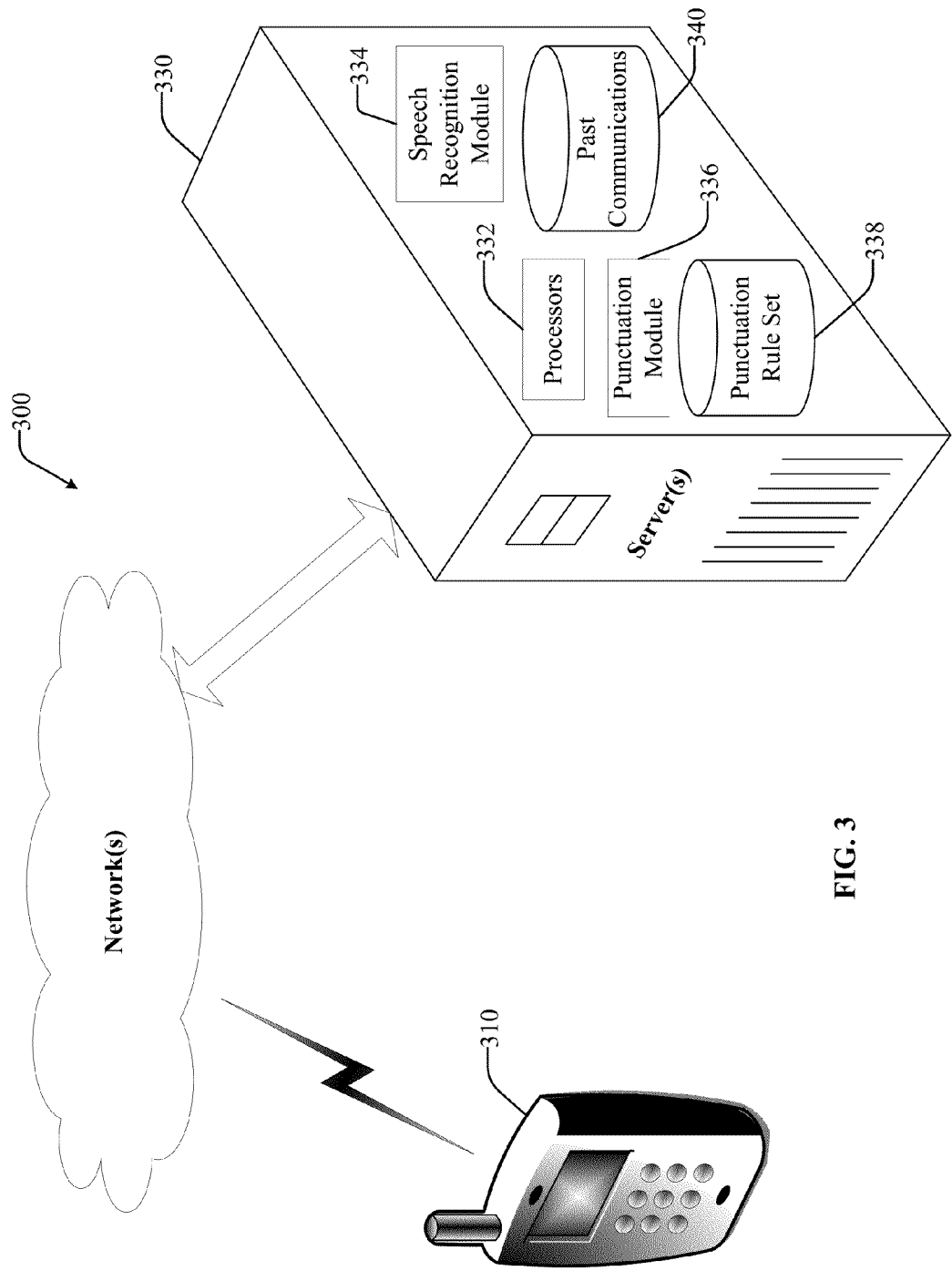
FIG. 3 is a diagram of an example system for transcribing an utterance and punctuating the transcription according to the punctuation preferences of the user.

FIG. 3 shows an example system 300 that can be used to implement the techniques described here. In general, the example system 300 can include a client computing device such as smartphone 310, a server system 330, and a network 320 by which the smartphone 310 can communicate with the server system 330, and vice versa. As described above, in some embodiments, the operations of the techniques provided here can be fully performed on a client device. In other embodiments, the processes can be shared between a client device and a server system. The example system 300 of FIG. 3 is an embodiment that shares processes between the client device (smartphone 310) and the server system 330. In example system 300, the majority of the significant processing functions are performed by the server system 330. However, the processing duties can be distributed between the client and server in other manners than those depicted by example system 300.

The client computing device is depicted as a smartphone 310. In other embodiments the client device can be a cell phone, PDA, mobile computing device, tablet computer, music player, wearable computer, e-book reader, desktop computer, laptop computer, and other types of processing devices.

The network 320 can include one or more networks, including, for example, a wireless network, WiFi network, wired network, LAN, intranet, internet, telephone network, and so on—and combinations of such networks. The network 320 can provide a communication linkage between the client device (smartphone 310) and the server system 330.

The server system 330 can be more than one server, including a cloud-based server system. The server system 330 can include one or more processors 332 that can execute coded instructions, including instructions for executing the techniques provided here. The server system 330 can also include a speech recognition module 334. The speech recognition module 334 can, in general, convert encoded audio files of utterances to text. A punctuation module 336 can also be included in the server system 330. The punctuation module 336 can access punctuation rules from a punctuation rule set repository 338. The punctuation rule set repository 338 may contain standard punctuation rules and customized punctuation rules for a particular user. Or, in some embodiments, the punctuation rule set repository 338 can contain standard punctuation rules only, and customized punctuation rules can be stored elsewhere or created on an ad hoc basis. The server system 330 can also include a repository of past communications 340. The repository of past communications 340 can store a user's previously created messages and documents. Those messages and documents can therefrom be parsed in order to create customized punctuation rules for the user that represent the preferences of the user in regard to punctuation approaches that are optional.

Figure 4:
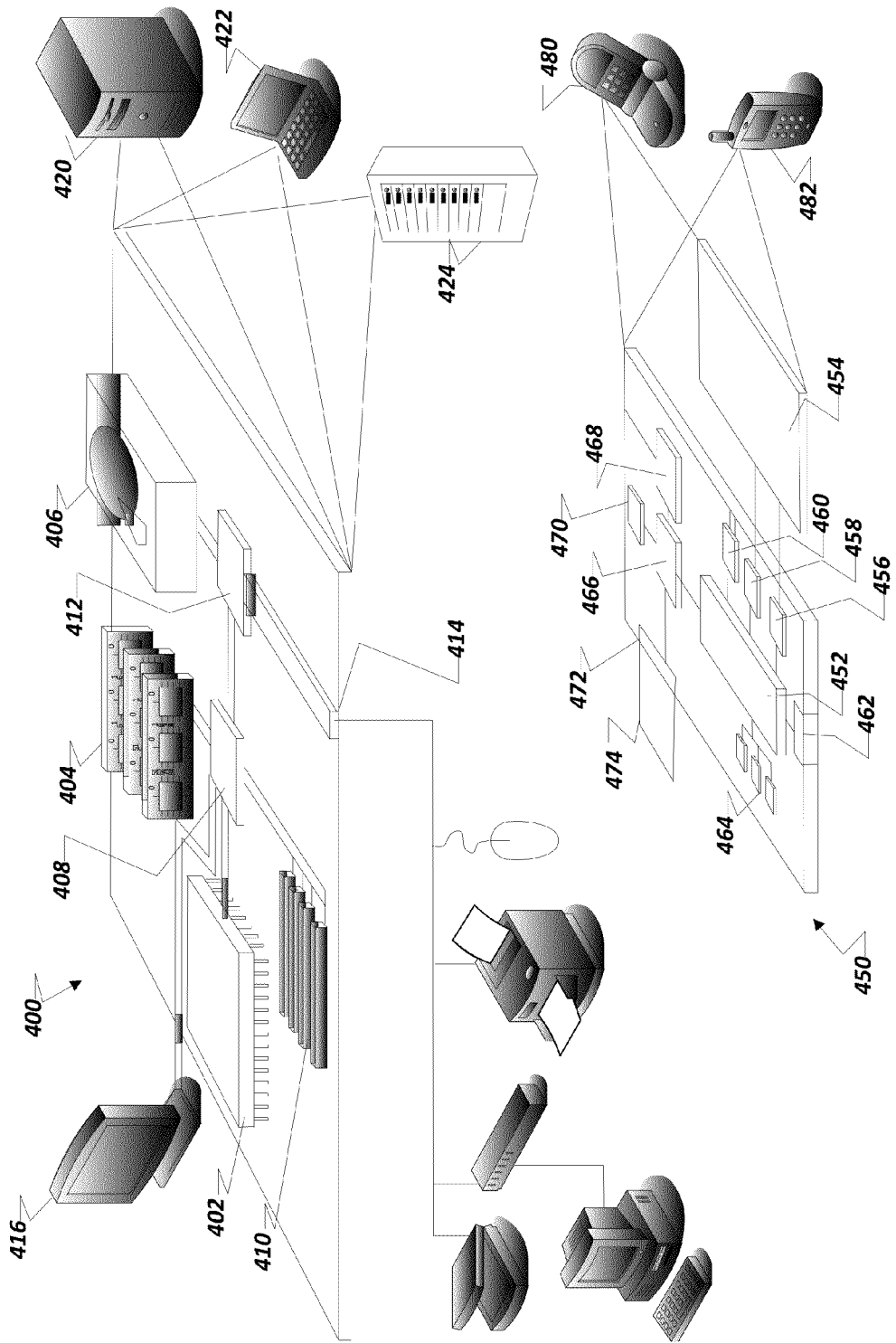
FIG. 4 shows an example system that can be used to implement the techniques described here.

FIG. 4 shows an example of a computing device 400 and an example of a mobile computing device that can be used to implement the techniques described here. The computing device 400 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The computer program product can also be tangibly embodied in a computer- or machine-readable medium, such as the memory 404, the storage device 406, or memory on the processor 402.

The high-speed interface 408 manages bandwidth-intensive operations for the computing device 400, while the low-speed interface 412 manages lower bandwidth-intensive operations. Such allocation of functions is exemplary only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a microdrive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provide as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 464, the expansion memory 474, or memory on the processor 452. In some implementations, the computer program product can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with operations re-ordered, added, or removed. Accordingly, other implementations are within the scope of the following claims.

What is claimed is:

1. A computer-implemented method comprising:
receiving audio data encoding an utterance of a user;
obtaining, by an automated speech recognizer, a transcription of the utterance of the user;
determining, by one or more processors, that one or more punctuation rules dictate that a punctuation mark may optionally be placed at a particular location within the transcription;
identifying, by the one or more processors, text that (i) was written by the user, (ii) is similar to the transcription, and (iii) includes a location that corresponds to the particular location within the transcription;
determining, by the one or more processors, whether the user placed the punctuation mark at the corresponding location within the text that was written by the user, and that is similar to the transcription; and
determining, by the one or more processors, whether to place or not place the punctuation mark at the particular location within the transcription of the utterance, according to the one or more punctuation rules, based on determining whether the user placed or did not place the punctuation mark at the corresponding location within the text that was written by the user, and that is similar to the transcription;
creating an electronic communication using the punctuated transcription, wherein the electronic communication is a type of electronic communication selected from the group consisting of an electronic mail message, a SMS text message, a social media message or post, or a word processing document; and
transmitting, by a client computing device, the electronic communication to a communication recipient.

2. The computer-implemented method of claim 1, further comprising:
developing custom punctuation rules based on the determining whether the user placed the punctuation mark at the corresponding location within the text.

3. The computer-implemented method of claim 1, wherein the text comprises one or more electronic mail messages, SMS text messages, social media messages, or word processing documents.

4. The computer-implemented method of claim 1, further comprising:
punctuating the transcription based at least on determining whether to place the punctuation mark at the particular location within the transcription; and
presenting the punctuated transcription to the user.

5. The computer-implemented method of claim 4, further comprising:
punctuating the transcription based at least on a standard punctuation rule set.

6. The computer-implemented method of claim 1, wherein the text is restricted to being exclusively a same type of electronic communication as the type of electronic communication created.

7. A non-transitory computer storage medium encoded with a computer program, the program comprising instructions that when executed by a data processing apparatus cause the data processing apparatus to perform operations comprising:
receiving audio data encoding an utterance of a user;
obtaining, by an automated speech recognizer, a transcription of the utterance of the user;
determining, by one or more processors, that one or more punctuation rules dictate that a punctuation mark may optionally be placed at a particular location within the transcription;
identifying, by the one or more processors, text that (i) was written by the user, (ii) is similar to the transcription, and (iii) includes a location that corresponds to the particular location within the transcription;

determining, by the one or more processors, whether the user placed the punctuation mark at the corresponding location within the text that was written by the user, and that is similar to the transcription;

determining, by the one or more processors, whether to place or not place the punctuation mark at the particular location within the transcription of the utterance, according to the one or more punctuation rules, based on determining whether the user placed or did not place the punctuation mark at the corresponding location within the text that was written by the user, and that is similar to the transcription;

creating an electronic communication using the punctuated transcription, wherein the electronic communication is a type of electronic communication selected from the group consisting of an electronic mail message, a SMS text message, a social media message or post, or a word processing document; and transmitting, by a client computing device, the electronic communication to a communication recipient.

8. The medium of claim 7, further comprising:

developing custom punctuation rules based on the determining whether the user placed the punctuation mark at the corresponding location within the text.

9. The medium of claim 7, wherein the text comprises one or more electronic mail messages, SMS text messages, social media messages, or word processing documents.

10. The medium of claim 7, further comprising:

punctuating the transcription based at least on determining whether to place the punctuation mark at the particular location within the transcription; and presenting the punctuated transcription to the user.

11. The medium of claim 7, wherein the text is restricted to being exclusively a same type of electronic communication as the type of electronic communication created.

12. A system comprising:

one or more computers and one or more non-transitory storage devices storing instructions that are operable, when executed by one or more computers, to cause the one or more computers to perform operations comprising:

receiving audio data encoding an utterance of a user;

obtaining, by an automated speech recognizer, a transcription of the utterance of the user;

determining, by one or more processors, that one or more punctuation rules dictate that a punctuation mark may optionally be placed at a particular location within the transcription;

identifying, by the one or more processors, text that (i) was written by the user, (ii) is similar to the transcription, and (iii) includes a location that corresponds to the particular location within the transcription;

determining, by the one or more processors, whether the user placed the punctuation mark at the corresponding location within the text that was written by the user, and that is similar to the transcription; and determining, by the one or more processors, whether to place or not place the punctuation mark at the particular location within the transcription of the utterance, according to the one or more punctuation rules, based on determining whether the user placed or did not place the punctuation mark at the corresponding location within the text that was written by the user, and that is similar to the transcription;

creating an electronic communication using the punctuated transcription, wherein the electronic communication is a type of electronic communication selected from the group consisting of an electronic mail message, a SMS text message, a social media message or post, or a word processing document; and transmitting, by a client computing device, the electronic communication to a communication recipient.

13. The system of claim 12, further comprising:

developing custom punctuation rules based on the determining whether the user placed the punctuation mark at the corresponding location within the text.

14. The system of claim 12, wherein the text comprises one or more electronic mail messages, SMS text messages, social media messages, or word processing documents.

15. The system of claim 12, further comprising:

punctuating the transcription based at least on determining whether to place the punctuation mark at the particular location within the transcription; and presenting the punctuated transcription to the user.

16. The system of claim 15, further comprising:

punctuating the transcription based at least on a standard punctuation rule set.

17. The system of claim 12, wherein the text is restricted to being exclusively a same type of electronic communication as the type of electronic communication created.

* * * * *